Nov. 3, 1964   G. H. ROHRBACK ETAL   3,155,933
PROBE FOR INSERTION IN CONDENSER TUBES OR THE LIKE
Filed June 26, 1961
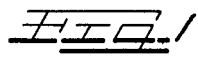
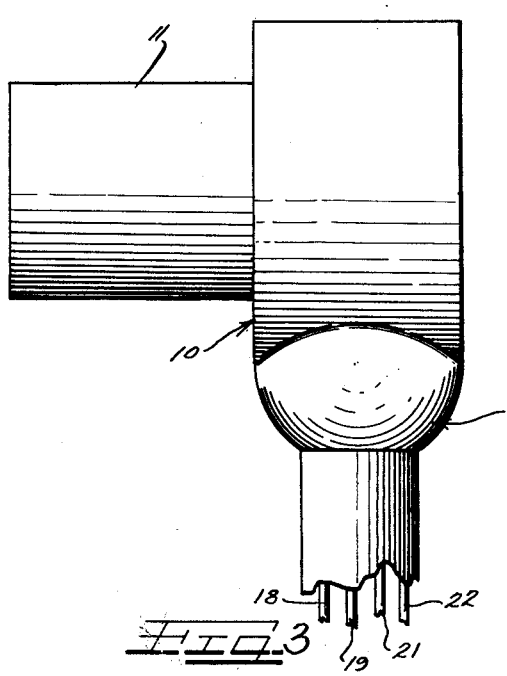
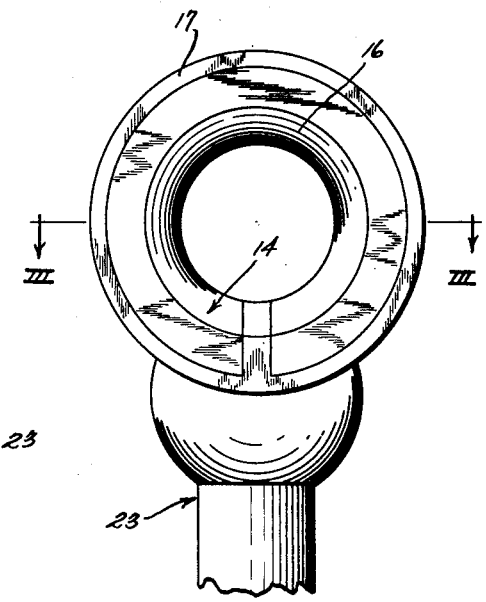
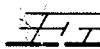
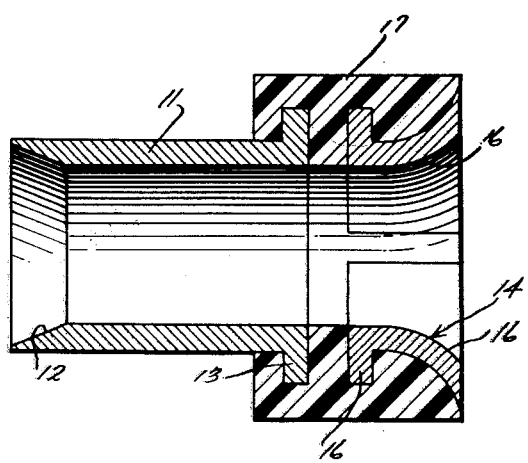
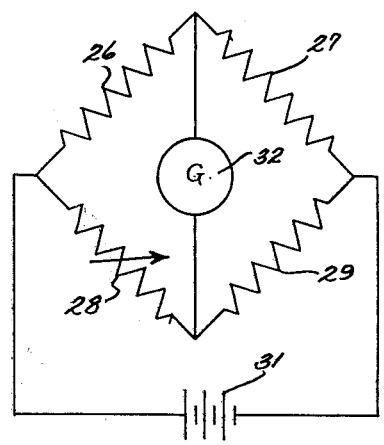
INVENTORS
GILSON H. ROHRBACK
WILLERD R. SCOTT JR.
BY
Hill, Sherman, Meroni, Gross & Simpson
ATTORNEYS

United States Patent Office 3,155,933
Patented Nov. 3, 1964

3,155,933
PROBE FOR INSERTION IN CONDENSER TUBES OR THE LIKE
Gilson H. Rohrback, Whittier, and Willard R. Scott, Jr., Fullerton, Calif., assignors to Magna Corporation, a corporation of California
Filed June 26, 1961, Ser. No. 119,736
5 Claims. (Cl. 338—13)

The present invention relates to an improved corrosion indicating probe assembly, particularly designed for measurement of corrosion in hollow structural elements such as condenser tubes.

Corrosion of condenser tubes in heat exchangers often poses a serious problem. If the tubes corrode and perforation occurs, then the fluid in the tubes contaminates the fluid in the shell, requiring a shut-down of the equipment. Without a means of measuring this damage, it is necessary to design large corrosion safety factors into heat exchanger units.

Cathodic protection has been employed with some degree of success in measuring corrosion at the ends of the condenser tubes. However, this system has no means for measuring the corrosive effects over short time intervals, short of shutting down the condenser for inspection.

A corrosion indicating probe for use in this environment should be located at those points where corrosion damage is likely to be most serious. It was determined that condenser tubes, in service, corrode most rapidly within the first few inches of the inlet end of the tubes. In most cases, serious corrosion occurs at the lip of the tube where the tube end is flared into the tube sheet. The most desirable corrosion indicating probe, therefore, would be one which would conveniently and continuously measure this corrosion in this locale.

The corporation indicating probe of the present invention can also be used to detect and measure corrosion at pipe inlets, convergent pipe sections, and at tank exits where sudden increases in liquid flow rates often cause excessive corrosion. The corrosion probe of the present invention can also be used to monitor the corrosiveness of solids and gases flowing in tubes.

An object of the present invention is to provide an improved corrosion indicating probe particularly adapted to measure corrosion in tubes through which material is flowing.

Another object of the invention is to provide a corrosion indicating probe which is readily insertable into the end of a condenser tube.

Still another object of the invention is to provide an improved corrosion indicating assembly including a probe element which is adapted to simulate the flared inlet end of a condenser tube.

Another object of the present invention is to provide a corrosion indicating probe which can be easily inserted into a tube or the like and which does not substantially interfere with the normal flow characteristics of the material in the tube.

In the preferred embodiment of the present invention, the improved sensing element is utilized as part of an electrical measuring system which determines the change in electrical resistance of the element as corrosion proceeds. In order to compensate for temperature variations, the system may include a compensating resistance element of a material similar to or identical to the corroding element, but protected against corrosion by a coating. Both the corrodible element and the compensating element are placed in the corrosive medium so that both elements are subjected to substantially equal proportional resistance changes caused by temperature variations in the medium. Thus, when the compensating element and the corroding element are placed in a suitable bridge circuit, the measurements obtained on the change in electrical resistance of the probe, and hence the measurement of the corrosion rate, will be independent of changes in temperature in the medium. This overall system of measuring corrosion, either continuously or intermittently, is broadly described and claimed in the Holmes et al. Serial No. 502,064, now Patent No. 3,104,355, entitled "Method and Means for Measuring Corrosion," filed April 18, 1955.

The present invention is particularly concerned with an improved probe element which can be employed in the electrical resistance measuring system described previously. In basic essentials, the corrosion indicating probe of the present invention consists of a hollow corrodible element and an electrically insulating resilient collar associated with the corrodible element for holding the element in axial alignment within the tube in the area in which the corrosion measurements are to be taken.

More particularly, the measuring element, or sensing element of this probe assembly consists of a small split ring with the inside diameter shaped as closely as possible to the shape of the flared inlet end of a condenser tube. A shouldered metal sleeve is aligned coaxially with the split ring and the two are joined in spaced relation by means of a collar of a non-conductive material such as an epoxy resin. The mounting tube is made of the same material as the tube in which it is placed, to avoid galvanic couples.

A further description of the present invention will be made in conjunction with the attached sheet of drawings which illustrate a preferred embodiment thereof.

In the drawings:

FIGURE 1 is a side elevational view of the probe assembly;

FIGURE 2 is a front elevational view of the improved probe assembly;

FIGURE 3 is a cross-sectional view taken substantially along the line III—III; and FIGURE 4 is an electrical circuit diagram illustrating the manner in which the corroding element forms a part of the corrosion measuring system.

As shown in the drawings:

Reference numeral 10 indicates generally the improved corrosion indicating probe of the present invention. Extending axially of the probe is a mounting tube 11 composed of brass or the like and being of the same material as the walls of the tube into which the probe is to be inserted. As best illustrated in FIGURE 3, the inner end of the mounting tube 11 has a tapered end face 12 to avoid providing an abrupt constriction to the flow of liquid through the probe.

The outer end of the tube 11 is provided with an annular flange 13 for a purpose to be hereinafter described.

The corroding element itself is indicated generally at reference numeral 14 in the drawing. It consists of a split ring made of a corrodible metal and having an annular flange portion 16 in spaced parallel relationship to the annular flange portion 13 of the tube 11. The outer end of the sensing element 14 is flared outwardly as indicated at numeral 16 to simulate the flared inlet end of a condenser tube.

As best is indicated in FIGURE 3, the tube 11 and the sensing element 14 are held in coaxially aligned spaced relationship by a collar 17 of a deformable, electrically non-conductive material such as a synthetic resin. The presence of the annular flange portions 13 and 16 provides better anchoring of the tube 11 and the sensing element 14 within the probe assembly.

The tube probe can be fabricated quite conveniently in the folowing manner. Suitably sized pieces were cut from bar stock and then machined to size. Wire leads were then soldered to the split ring 14 and to the sleeve 11. Two leads were attached to each end of the ring 14, making a total of four. One additional lead was attached to the sleeve 11 for grouding to the condenser tube. The four leads extending from the sensing element 14, and indicated at numerals 18, 19, 21, and 22 in FIGURE 1 were contained in a neoprene jacket 23 which is resistant to sea water, organic fluids, and other liquids.

The sensing element 14, the metal sleeve 11, and the cable end were then placed into a potting die. Standard potting techniques can be used, including the conventional potting release agents, a standard epoxy potting compound, such as "Shell No. 828" or "Epocast No. 2" and using the normal curing cycles.

After curing, the probe was removed from the die and then hand finished. This entailed machining the epoxy resin away from the surface of the measuring element and smoothing the epoxy around the edges of the probe. The inside edge of the tube 11 was then beveled in a lathe to provide the tapered edge 12 shown in FIGURE 3.

In use, the corrosion indicating probe 10 is inserted into the end of the condenser tube, and the collar 17 is deformed into a force fit within the walls of the tube.

The cable 23 has a suitable water-tight pressure fitting and electrical receptacle at the other end so that electrical measurements can be made at any time outside the enclosure in which the probe is located.

A typical electrical system for measuring the corrosion of the sensing element 14 is illustrated in FIGURE 4 of the drawings. In the circuit diagram of FIGURE 4, reference numeral 26 represents the electrical resistance provided by the sensing element 14, and numeral 27 the resistance afforded by the compensating or reference element. The reference element is preferably located separately from the probe unit itself but it nevertheless is subjected to the same conditions of temperature as encountered by the probe.

The other arms of the bridge circuit illustrated in FIGURE 4, include a variable resistor 28 and a fixed resistor 29. A potential is applied, as by means of a battery 31 between opposed arms of the bridge circuit, and a sensing device such as a galvanometer 32 is disposed between the opposite arms of the bridge. Thus, when the corrosion proceeds on the sensing element 14, the increase in electrical resistance caused by the reduction in area of the sample itself can be detected continuously by adjusting the variable resistor 28 until there is no current flow in the galvanometer 32. The variable resistor 28 can be calibrated in corrosion units to give continuous indication of the amount of corrosion which has taken place.

From the foregoing, it will be appreciated that the present invention provides a simplified, but highly effective means for measuring corrosion in environments in which such measurement has been considered difficult, if not impossible. The particular configuration of the improved probe assembly of the present invention also provides only a minimal amount of disruption to the normal flow character of the material flowing in the tube while simulating in all other respects the conditions existing during the normal operation of the assembly.

It will be evident that various modifications can be made to the described embodiments without departing from the scope of the present invention.

We claim as our invention:

1. A corrosion indicating probe for insertion into a metallic tube comprising a hollow corrodible element permitting flow of the corrosive fluid therethrough, electrical leads extending from said element, and an electrically insulating collar mounted on said corrodible element for holding said element in axial alignment within said tube.

2. A corrosion indicating probe for insertion into a condenser tube or the like comprising a hollow corrodible element having an outwardly flared end portion, said element permitting flow of the corrosive fluid therethrough, electrical leads extending from said element, and an electrically non-conductive collar disposed about the periphery of said corrodible element for holding said element in axial alignment within said tube.

3. A corrosion indicating probe assembly for insertion into a condenser tube or the like comprising a hollow corrodible element in the form of a split ring and having an outwardly flared end portion, said element permitting flow of the corrosive fluid therethrough, electrical leads extending from said element, and a resilient, electrically non-conductive collar disposed about the periphery of said corrodible element for holding said element in axial alignment within said tube.

4. A corrosion indicating probe assembly comprising a corrodible axially split ring sensing element, a cylindrical mounting tube coaxial with said ring and axially spaced therefrom, and a collar of electrically non-conductive material engaging said ring and said tube to hold the same in spaced, axial alignment.

5. A corrosion indicating probe assembly comprising a corrodible split ring sensing element having an outwardly flared portion at one end and an annular flange portion at the other end, a cylindrical mounting tube coaxial with said ring and having an annular flange portion spaced from the annular flange portion on said ring, and a collar of an electrically non-conductive material surrounding both of said annular flange portions to hold said tube and said ring in spaced, axial alignment.

References Cited in the file of this patent

UNITED STATES PATENTS

| | | |
|---|---|---|
| 2,484,279 | Foltz | Oct. 11, 1949 |
| 2,856,495 | Chittum et al. | Oct. 14, 1958 |